(12) United States Patent
Tsurusaki et al.

(10) Patent No.: US 10,858,947 B2
(45) Date of Patent: Dec. 8, 2020

(54) METHOD FOR MEASURING PRE-TWIST AMOUNT OF BLADE, AND METHOD FOR MANUFACTURING ROTOR

(71) Applicant: MITSUBISHI HEAVY INDUSTRIES COMPRESSOR CORPORATION, Tokyo (JP)

(72) Inventors: Yuzo Tsurusaki, Hiroshima (JP); Yuki Nakamura, Hiroshima (JP); Yuichi Sasaki, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 77 days.

(21) Appl. No.: 16/462,130

(22) PCT Filed: Feb. 24, 2017

(86) PCT No.: PCT/JP2017/007158
§ 371 (c)(1),
(2) Date: May 17, 2019

(87) PCT Pub. No.: WO2018/154724
PCT Pub. Date: Aug. 30, 2018

(65) Prior Publication Data
US 2019/0330991 A1 Oct. 31, 2019

(51) Int. Cl.
*F01D 5/30* (2006.01)
*F01D 5/22* (2006.01)
(Continued)

(52) U.S. Cl.
CPC .......... *F01D 5/3007* (2013.01); *B23P 15/006* (2013.01); *F01D 5/225* (2013.01);
(Continued)

(58) Field of Classification Search
CPC .......... B23P 15/006; B23P 15/02; F01D 5/00; F01D 5/12; F01D 5/16; F01D 5/225;
(Continued)

(56) References Cited

U.S. PATENT DOCUMENTS

| 5,511,948 A * | 4/1996 | Suzuki | F01D 5/225 416/191 |
| 2002/0057969 A1* | 5/2002 | Namura | F01D 5/22 416/238 |

(Continued)

FOREIGN PATENT DOCUMENTS

| JP | 2014-214605 A | 11/2014 |
| JP | 2016-084780 A | 5/2016 |

OTHER PUBLICATIONS

International Search Report and Written Opinion in corresponding International Application No. PCT/JP2017/007158, dated Apr. 25, 2017 (11 pages).

*Primary Examiner* — Matthew P Travers
(74) *Attorney, Agent, or Firm* — Osha Bergman Watanabe & Burton LLP (57) ABSTRACT

A method for measuring a pre-twist amount of a blade includes a spreading dimension acquiring step, a misalignment acquiring step, a correcting step, and a pre-twist amount acquiring step. In the spreading dimension acquiring step, circumferential spreading dimensions of each shroud of two rotor blades are acquired. In the misalignment acquiring step, a misalignment amount in the direction of the axis between the shrouds of two rotor blades adjacent to each other in the circumferential direction is measured. In the correcting step, the spreading dimension acquired in the spreading dimension acquiring step is corrected on the basis of the misalignment amount acquired by the misalignment acquiring step. In the pre-twist amount acquiring step, the
(Continued)

pre-twist amount of the blade is acquired on the basis of the spreading dimension corrected in the correcting step.

6 Claims, 6 Drawing Sheets

(51) Int. Cl.
*B23P 15/00* (2006.01)
*F01D 25/28* (2006.01)

(52) U.S. Cl.
CPC ........ *F01D 25/28* (2013.01); *F05D 2200/263* (2013.01); *F05D 2220/31* (2013.01); *F05D 2230/10* (2013.01); *F05D 2230/60* (2013.01); *F05D 2240/24* (2013.01); *F05D 2240/30* (2013.01); *F05D 2260/83* (2013.01)

(58) Field of Classification Search
CPC .......... F01D 5/30; F01D 5/3007; F01D 25/28; F05D 2200/263; F05D 2230/10; F05D 2230/60; F05D 2260/83; Y10T 29/49321; Y10T 29/49336–49339
See application file for complete search history.

(56) References Cited

U.S. PATENT DOCUMENTS

| | | | |
|---|---|---|---|
| 2006/0127221 A1* | 6/2006 | Yamashita | F01D 5/225 416/222 |
| 2013/0323053 A1* | 12/2013 | Ramannagari | F01D 5/225 416/1 |
| 2019/0249555 A1* | 8/2019 | Yagi | F01D 5/225 |

* cited by examiner

METHOD FOR MEASURING PRE-TWIST AMOUNT OF BLADE, AND METHOD FOR MANUFACTURING ROTOR

TECHNICAL FIELD

The present invention relates to a method for measuring a pre-twist amount of a blade and a method for manufacturing a rotor.

BACKGROUND ART

When assembling a rotor such as a turbine or a compressor, a rotor blade row is formed by sequentially attaching a plurality of rotor blades in a circumferential direction of a disk-shaped disc. There are cases where a plurality of blade grooves for attaching the rotor blades are formed side by side in a circumferential direction of the disc. The blade grooves are grooves extending in the direction of an axis of the disc and are provided to penetrate the disc in a direction of the axis. By sliding a blade root of the rotor blade to be fitted to the blade groove from one side of the disc in the direction of the axis, the rotor blade is attached to the disc.

For example, a pre-twist blade in which a twist amount is given in advance in an extending direction of the rotor blades is known as the rotor blade. When such a pre-twist blade is arranged on the disc, shrouds of the adjacent rotor blades come into contact with each other to press against each other. Therefore, the pre-twist blade is fixed on the disc under a pre-designed twist amount.

In this manner, since the pressing force based on the pre-twist amount is generated between the shrouds, when arranging the rotor blades on the disc, it is necessary to assemble the rotor blades, while resisting the pressing force.

Incidentally, in general, the rotor blades are provided by being cut by a machining center or the like. That is, when the rotor blade is fitted into the disc, final assembling is performed via a temporary process and a re-cutting to absorb dimensional errors occurring during the cutting process or the like.

Patent Literature 1 discloses a technique for presuming the pre-twist amount by measuring a distance between the shrouds of the two adjacent rotor blades in the circumferential direction. In Patent Literature 1, each abutting surface of the adjacent shrouds is cut on the basis of the presumed pre-twist amount to adjust the pre-twist amount to fall within a predetermined target pre-twist amount.

CITATION LIST

Patent Literature

[Patent Literature 1]
Japanese Unexamined Patent Application. First Publication No. 2016-84780

SUMMARY OF INVENTION

Technical Problem

However, when presuming the pre-twist amount as described in Patent Literature 1, it was found that there is a case where the presumed pre-twist amount is different from an actual pre-twist amount.

The present invention provides a method for measuring a pre-twist amount of a blade capable of more precisely presuming a pre-twist amount and a method for manufacturing a rotor.

Solution to Problem

According to a first aspect of the present invention, there is provided a method for measuring a pre-twist amount of a blade included in a plurality of rotor blades attached to an outer circumferential portion of a disc rotatable about an axis. The method for measuring a pre-twist amount of a blade includes spreading dimension acquiring step, a misalignment acquiring step, a correcting step, and a pre-twist amount acquiring step. In the spreading dimension acquiring step, two rotor blades adjacent to each other in a circumferential direction is attached to the disc by causing the two adjacent rotor blades to slide in a direction of an axis so that contact surfaces of shrouds formed at blade tips of each blade come into contact with each other, and a spreading dimension in the circumferential direction of each shroud of the two rotor blades attached to the disc is acquired. In the misalignment acquiring step, a misalignment amount in the direction of the axis between the shrouds of the two rotor blades adjacent to each other in the circumferential direction is obtained. In the correcting step, a spreading dimension acquired in the spreading dimension acquiring step is corrected on the basis of the misalignment amount acquired in the misalignment acquiring step. In the pre-twist amount acquiring step, a pre-twist amount of the blade is acquired on the basis of the spreading dimension corrected in the correcting step.

In this manner, by measuring the misalignment amount in the direction of the axis between the shrouds of the two rotor blades adjacent to each other in the circumferential direction, while acquiring the spreading dimension of the shroud in the circumferential direction, the misalignment of the pre-twist amount caused by the misalignment amount in the direction of the axis can be corrected with respect to the pre-twist amount obtained from the spreading dimension. Therefore, it is possible to more accurately predict the pre-twist amount.

According to a second aspect of the present invention, the method for measuring the pre-twist amount of the blade according to the first aspect may further include a reference position detecting step of attaching only one rotor blade of the two adjacent rotor blades to the disc to detect a reference position of the one rotor blade, and attaching only the other rotor blade of the adjacent two rotor blades to the disc to detect a reference position of the other rotor blade. In the spreading dimension acquiring step, the dimensions in the circumferential direction of each shroud of the two adjacent rotor blades attached to the disc may be detected, and the detected dimensions in the circumferential direction of each shroud may be compared with the reference position of the one rotor blade and the reference position of the other rotor blade to acquire the spreading dimension.

By doing so, the spreading dimension can be obtained by merely comparing the respective reference positions of the two rotor blades with the dimensions of the two shrouds in the circumferential direction when inserting the two rotor blades so that the contact surfaces come into contact with each other.

According to a third aspect of the present invention, in the method for measuring the pre-twist for blades according to the second aspect, the spreading dimension acquiring step and the reference position detection step may be sequentially performed on the two adjacent rotor blades over the entire circumference of the disc.

By doing so, it is possible to measure the pre-twist amount for all the rotor blades merely by repeating the same step over the entire circumference of the disc.

According to a fourth aspect of the present invention, there is provided a method for manufacturing a rotor, using the method for measuring the pre-twist amount of the blade according to any one of the first to third aspects. The method for manufacturing the rotor includes a cutting step of cutting a contact surface of the shroud on the basis of the pre-twist amount corrected by the correcting step. The method for manufacturing the rotor further includes a step of sequentially attaching the rotor blade of which the contact surface is cut to the disc.

By doing so, the contact surfaces can be cut on the basis of the corrected pre-twist amount. Therefore, the rotor blades of which the contact surfaces are appropriately cut can be, for example, collectively inserted into a blade groove. That is, when attaching the rotor blade to the disc, the rotor can be easily manufactured without returning to other steps or repeating or the like.

Advantageous Effects of Invention

According to the method for measuring the pre-twist amount of the blade and the method for manufacturing the rotor, it is possible to more accurately presume the pre-twist amount.

DESCRIPTION OF EMBODIMENTS

Next, a rotor according to an embodiment of the present invention will be described with reference to the drawings.

Figure 1:
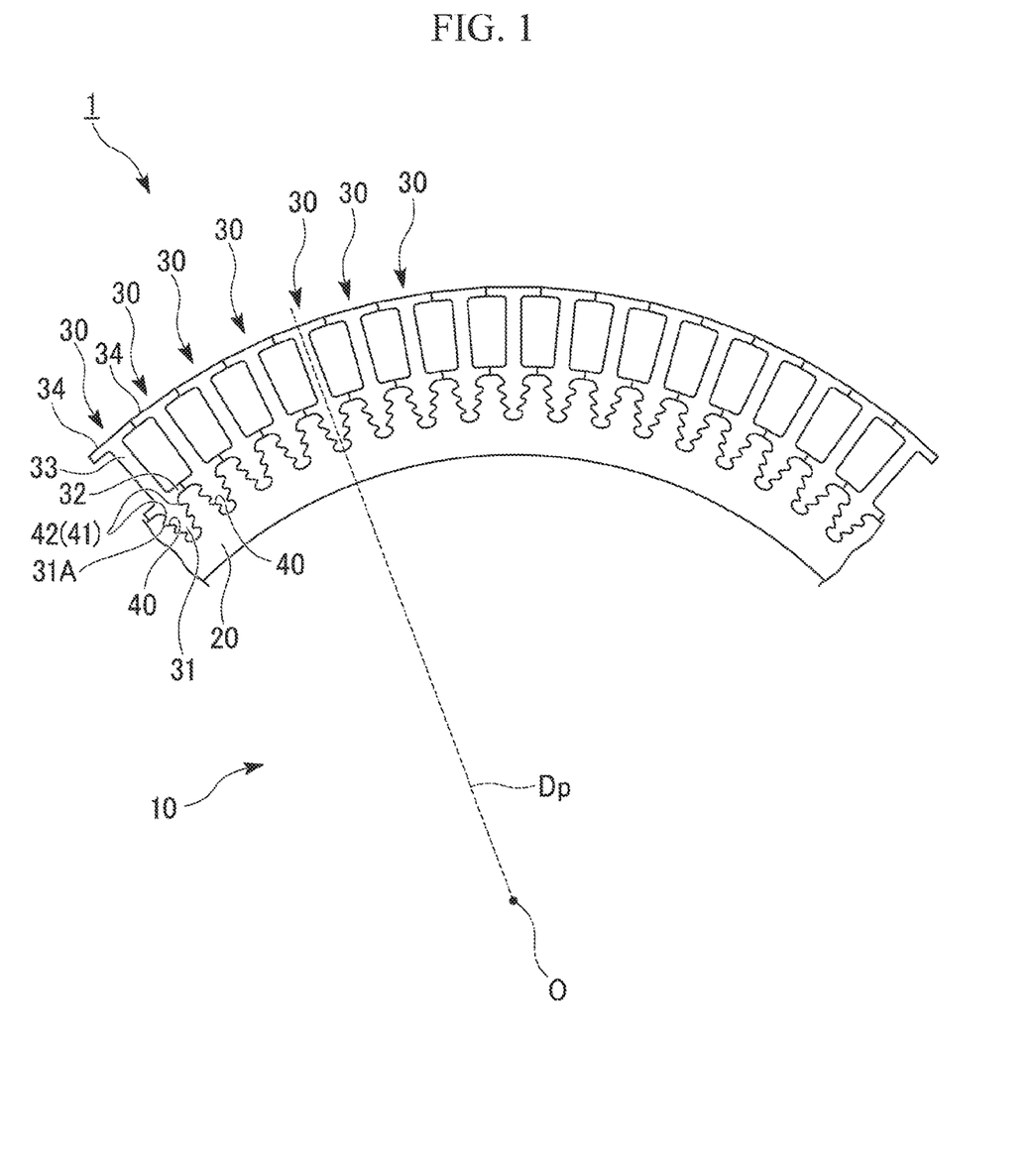
FIG. 1 is an enlarged view of a part of a rotor according to this embodiment when viewed in a direction of an axis.

FIG. 1 is an enlarged view of a part of the rotor according to this embodiment when viewed in a direction of an axis.

As illustrated in FIG. 1, the rotor 1 includes a rotor main body 10, a disc 20, and a plurality of rotor blades 30.

The rotor main body 10 is formed in a columnar shape extending in the direction of an axis O. The rotor main body 10 is provided, for example, inside a turbine such as a steam turbine. The rotor main body 10 is supported to be rotatable about the axis O.

The disc 20 is formed to cover an outer circumferential surface of the rotor main body 10. The disc 20 supports a plurality of rotor blades 30 in a state of being arranged side by side in the circumferential direction of the rotor 1. The plurality of rotor blades 30 attached to the single disc 20 form a single rotor blade row. Here, such rotor blade rows are provided in the rotor main body 10 in a plurality of stages at intervals in the direction of the axis O of the rotor 1. In the following description, a direction in which the axis O of the rotor 1 extends and a direction around the axis O are simply referred to as the direction of the axis O and a circumferential direction, respectively.

The rotor 1 is accommodated in a casing (not illustrated) of a turbine such as a steam turbine. A plurality of stator blade rows (not illustrated) are provided inside the casing in the direction of the axis O. The stator blade rows and the rotor blade rows are arranged alternately along the direction of the axis O, thereby forming a turbine flow path.

In the case of a steam turbine, when high-temperature and high-pressure steam is supplied to the turbine flow path, the rotor 1 rotates. The rotational energy of the rotor 1 is converted into electric energy by, for example, a generator.

Next, the structure for attaching the rotor blades 30 to the disc 20 will be described in detail.

As illustrated in FIG. 1, a plurality of blade grooves 40 are formed on the outer circumferential surface (an outer circumferential portion) of the disc 20 at intervals in the circumferential direction. Each of the blade grooves 40 is formed to be recessed radially inward from the outer circumferential surface of the disc 20. Both sides of the blade groove 40 in the direction of the axis O are opened. That is, the blade groove 40 is formed to penetrate the disc 20 in the direction of the axis O.

The blade groove 40 has a pair of inner wall surfaces 41 facing each other in the circumferential direction. The inner wall surfaces 41 have a plurality of teeth 42 continuous in a serrated shape. The pair of inner wall surfaces 41 is formed such that a circumferential interval gradually decreases from the outside toward the inside in the radial direction. As a result, the blade groove 40 becomes a substantially V-shaped groove when viewed from the direction of the axis O. Specifically, the pair of inner wall surfaces 41 is formed to be line-symmetrical with respect to a rotor blade reference line Dp extending in the radial direction through a center (the axis O) of the rotor 1.

The rotor blade 30 includes a blade root 31, a platform 32, a blade 33, and a shroud 34.

The blade root 31 is attachable to and detachable from the blade groove 40 on the disc 20. The blade root 31 is formed in a wedge shape when viewed from the direction of the axis O to correspond to the V-shaped blade groove 40. On the pair of outer wall surfaces of the blade root 31 in the circumferential direction, serrations 31A having a shape corresponding to the blade groove 40 and the teeth 42 are formed, respectively. That is, as the teeth 42 of the blade groove 40 mesh with the serrations 31A, the rotor blade 30 is supported by the disc 20. As will be described below in detail, a gap 50 (see FIG. 5) is formed between the serration 31A and the inner wall surface 41 of the blade groove 40. In other words, the volume of the blade root 31 is formed to be slightly smaller than the capacity of the blade groove 40. The gap 50 is provided in advance at the time of designing to absorb processing errors and the like of the blade groove 40 and the rotor blade 30, respectively.

Figure 2:
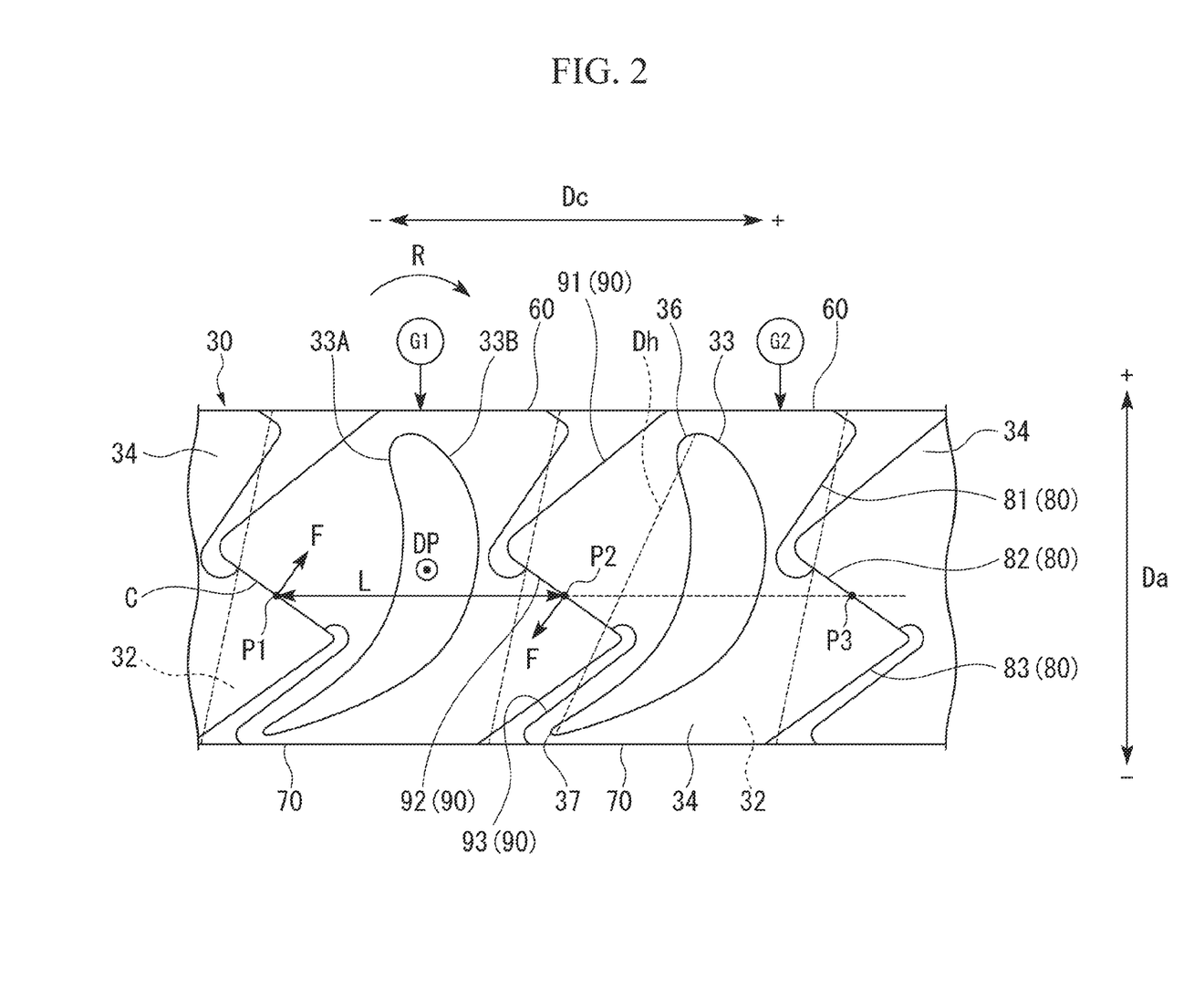
FIG. 2 is a view of the rotor according to the embodiment of the present invention when viewed from an outer side in a radial direction.

FIG. 2 is a view of the rotor according to the embodiment of the present invention when seen from the outer side in the radial direction.

A platform 32 is a rectangular plate-like member provided on the outer side of the blade root 31 in the radial direction. As illustrated in FIG. 2, the platform 32 in the embodiment is formed in a substantial parallelogram shape when viewed from the circumferential direction. The radially inner surface of the platform 32 is formed to abut the outer circumferential surface of the disc 20. Further, both sides of the platform 32 in the circumferential direction are formed to abut on the platform 32 of adjacent another rotor blade 30. The shape and dimension of the platform 32 are appropriately selected according to the design, and are not limited to the present embodiment.

The blade 33 extends radially outward from the platform 32. The blade 33 has a cross section of an airfoil when viewed from the radial direction.

As illustrated in FIG. 2, the blade 33 has an abdominal portion 33A and a back portion 33B. The abdominal portion 33A is formed in a curved surface shape that is concave toward one side in the circumferential direction. The back portion 33B is formed in a curved surface shape which is convex toward the other side in the circumferential direction on the opposite sides of the front and rear of the abdominal portion 33A. The curved surfaces forming the abdominal portion 33A and the back portion 33B are continuously connected at both end edges in a direction (a blade chord direction Dh) intersecting the axis O. Among both end edges in the blade chord direction Dh, an end edge on one side is a leading edge 36 formed in a curved surface shape. An end edge on the side opposite to the leading edge 36 in the blade chord direction Dh is a trailing edge 37 formed in a pointed shape.

In the rotor blade 30 of the embodiment, the shape immediately after manufacturing is made uniform along the rotor blade reference line Dp. However, the shape immediately after manufacturing of the blade 33 is not limited to this shape. For example, the shape of the blade may be a so-called twisted blade shape so that the blade 33 is twisted around the rotor blade reference line Dp in advance, from the side close to the blade root toward the side close to the blade tip along the rotor blade reference line Dp.

The blade 33 is disposed such that, in the flowing direction of the fluid inside the turbine, the leading edge 36 side faces an upstream side on which the fluid flows, and the trailing edge 37 side faces a downstream side on which the fluid flows away. In FIG. 2, the upstream side is represented as a +Da direction and the downstream side is represented as a −Da direction.

The blade 33 is disposed such that the fluid flowing from the upstream side collides with the abdominal portion 33A. As a result, a force directed from the abdominal portion 33A side to the back portion 33B side acts on the blade 33. Due to the force, the rotor 1 rotates about the axis O. The direction in which the rotor 1 rotates at this time, that is, the direction from the abdominal portion 33A side to the back portion 33B side of the blade 33 is referred to as a front side in the rotational direction, and a side opposite to the front side in the rotational direction is referred to as a rear side in the rotational direction. In FIG. 2, the front side in the rotational direction is represented as the +Dc direction and the rear side in the rotational direction is represented as the −Dc direction.

The shroud 34 is formed at a radially outer end portion of the blade 33 and formed in a plate shape. As illustrated in FIG. 1, the shroud 34 extends in a direction intersecting the rotor blade reference line Dp.

The shroud 34 has an upstream end edge 60 formed on the upstream side and a downstream end edge 70 formed on the downstream side. The upstream end edge 60 and the downstream end edge 70 extend in the circumferential direction, respectively.

The shroud 34 includes a front end edge 80 formed on the front side in the rotational direction, and a rear end edge 90 formed on the rear side in the rotational direction. Both the front end edge 80 and the rear end edge 90 have three side portions.

The front end edge 80 has a first front end edge 81, a second front end edge 82, and a third front end edge 83 in order from the upstream side to the downstream side.

The first front end edge 81 is inclined to be disposed on the rear side in the rotational direction from the upstream side toward the downstream side. An upstream side end portion of the first front end edge 81 and an end portion of the front side in the rotational direction of the upstream end edge 60 are connected to each other by a curved surface that is curved toward the front side in the rotational direction. A downstream side end portion of the first front end edge 81 is formed in a circular arc shape by being gradually curved toward the front side in the rotational direction.

The second front end edge 82 is formed to be inclined to face the front side in the rotational direction toward the downstream side, from the downstream side end portion of the first front end edge 81. As will be described below in detail, the second front end edge 82 is a contact surface that abuts on a part of the shroud 34 of another rotor blade 30 that is adjacent to each other in the circumferential direction on the disc 20.

The third front end edge 83 is formed to be inclined from the downstream side end portion of the second front end edge 82 toward the rear side in the rotational direction as going to the downstream side. The downstream side end portion of the third front end edge 83 is connected to an end portion on the front side in the rotational direction of the aforementioned downstream end edge 70.

Similarly to the front end edge 80, the rear end edge 90 includes, in order from the upstream side to the downstream side, a first rear end edge 91, a second rear end edge 92, and a third rear end edge 93, respectively.

The first rear end edge 91 extends in the same direction as the first front end edge 81.

The second rear end edge 92 extends in substantially the same direction as the second front end edge 82. The second rear end edge 92 is formed to mostly abut on the second front end edge 82 which is the contact surface of the shroud 34 of another rotor blade 30 adjacent to each other in the circumferential direction. In other words, among the two adjacent rotor blades 30, the second front end edge 82 of one rotor blade 30 and the second rear end edge 92 of the other rotor blade 30 extend to be inclined at the same angle with respect to an upstream-downstream direction (the direction of the axis O).

The third rear end edge 93 extends along the same direction as the third front end edge 83. The downstream side end portion of the third rear end edge 93 is connected to an end portion on the rear side in the rotational direction at the downstream end edge 70.

The rotor blade 30 configured as described above is fixed to the blade groove 40 provided on the disc 20. More specifically, by sliding the blade root 31 of the rotor blade 30 to be inserted from the opening on one side of the blade groove 40, the serrations 31A of the blade root 31 and the teeth 42 of the blade groove 40 mesh with each other. As a result, even if a centrifugal force is applied to the rotor blade 30 while the rotor 1 is rotating, the rotor blade 30 is supported without being dropped outward from the disc 20 in the radial direction.

To assemble the rotor 1, the blade roots 31 of the plurality of rotor blades 30 are sequentially inserted into the aforementioned plurality of blade grooves 40 in the circumferential direction. In the rotor blade 30 in which the blade root 31 is sequentially inserted in the circumferential direction as described above, the second front end edge 82 and the second rear end edge 92 which are the contact surfaces of the two adjacent rotor blades 30 abut on each other (see FIG. 2). Hereinafter, a portion at which the second front end edge 82 and the second rear end edge 92 abut on each other is referred to as an abutting portion C.

As illustrated in FIG. 2, one point on the three abutting portions C formed by the four rotor blades 30 (the shroud 34) sequentially arranged is defined as P1, P2, and P3 from the rear side to the front side in the rotational direction. Further, a length from P1 to P2 in a state in which the rotor 1 is assembled is defined as L.

In the rotor blade 30 immediately after manufacturing, the length between the second rear end edge 92 and the second front end edge 82 is set to be slightly larger than L. Specifically, a cutting margin K (see FIG. 7) is formed on the second rear end edge 92 and the second front end edge 82, respectively. Therefore, when a pair of rotor blades 30 immediately after manufacturing are come to adjacent to each other and inserted into the blade groove 40, since the mutual cutting margins K interfere with each other, force in the direction separating from each other is applied on the pair of rotor blades 30 in the circumferential direction (the rotational direction).

When viewing the pair of rotor blades 30 in such a state from the outside in the radial direction, a force F in a direction orthogonal to the abutting portions C is applied to the second front end edge 82 and the second rear end edge 92. The force F directed toward the rear side in the rotational direction is applied to the second front edge 82 from the upstream side toward the downstream side. The force F as a reaction force directed toward the front side in the rotational direction is applied to the second rear end edge 92 from the downstream side toward the upstream side.

By the action of the forces F, a rotational moment R directed in the direction indicated by an arrow in FIG. 2 is added to the rotor blades 30. In a case in which the blade 33 of the rotor blade 30 is set as a reference, the rotor blade 30 is twisted by the rotational moment R such that the leading edge 36 is directed toward the front side in the rotational direction and the trailing edge 37 is directed toward the rear side in the rotational direction. The amount of twisting at this time is called a pre-twist amount. The pre-twist amount is a physical amount obtained by expressing a rotation amount of the rotor blade 30 about a specific reference line, for example, in a unit system such as radian.

Here, in the rotor blade 30 according to the embodiment, the pre-twist amount of the rotor blade 30 in a state of being attached to the rotor main body 10 is defined as a design value (a target pre-twist amount) in advance.

That is, in order to assemble the rotor 1, it is necessary to adjust the shape of the rotor blade 30 so that the pre-twist amount of the rotor blade 30 becomes the target pre-twist amount. This adjustment is performed by performing the cutting process or the like on the cutting margin K in either the second front end edge 82 or the second rear end edge 92. The pre-twist amount of the rotor blades 30 is adjusted depending on the cutting amount at this time.

Figure 3:
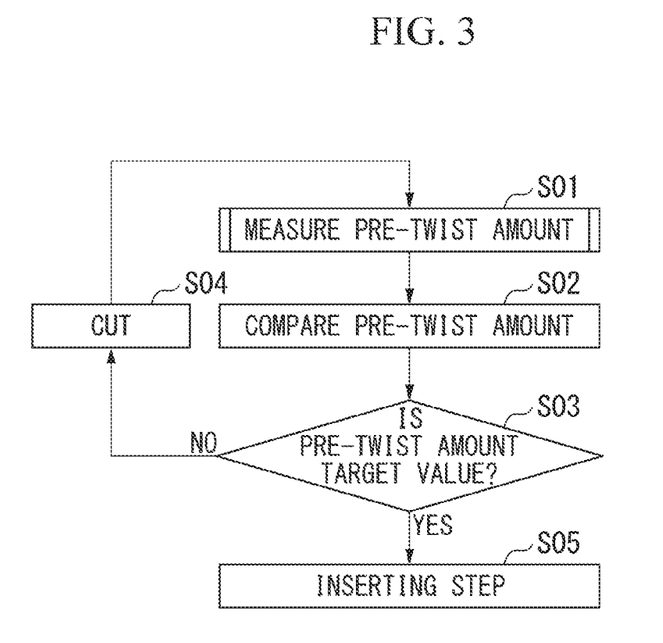
FIG. 3 is a flowchart illustrating each step of a method for measuring a pre-twist and a method for manufacturing a rotor according to the embodiment of the present invention.
Figure 4:
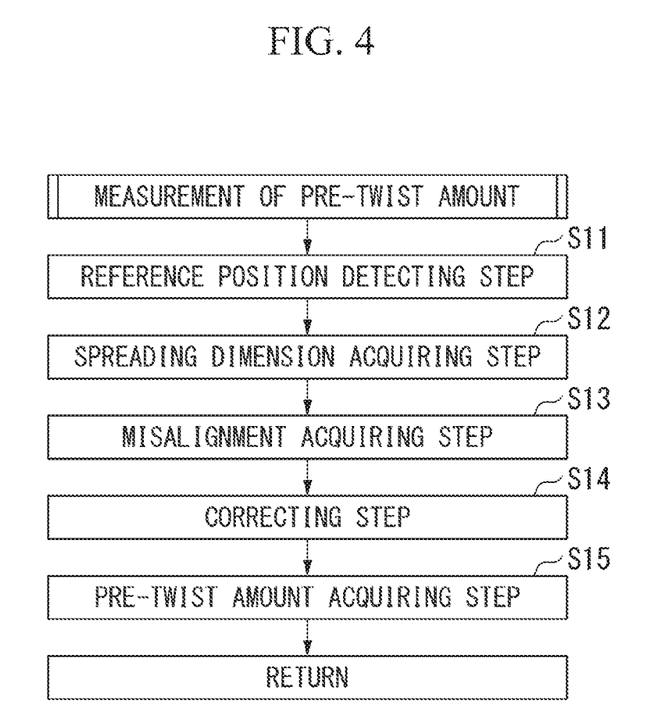
FIG. 4 is a flowchart illustrating the method for measuring the pre-twist according to the embodiment of the present invention.
Figure 5:
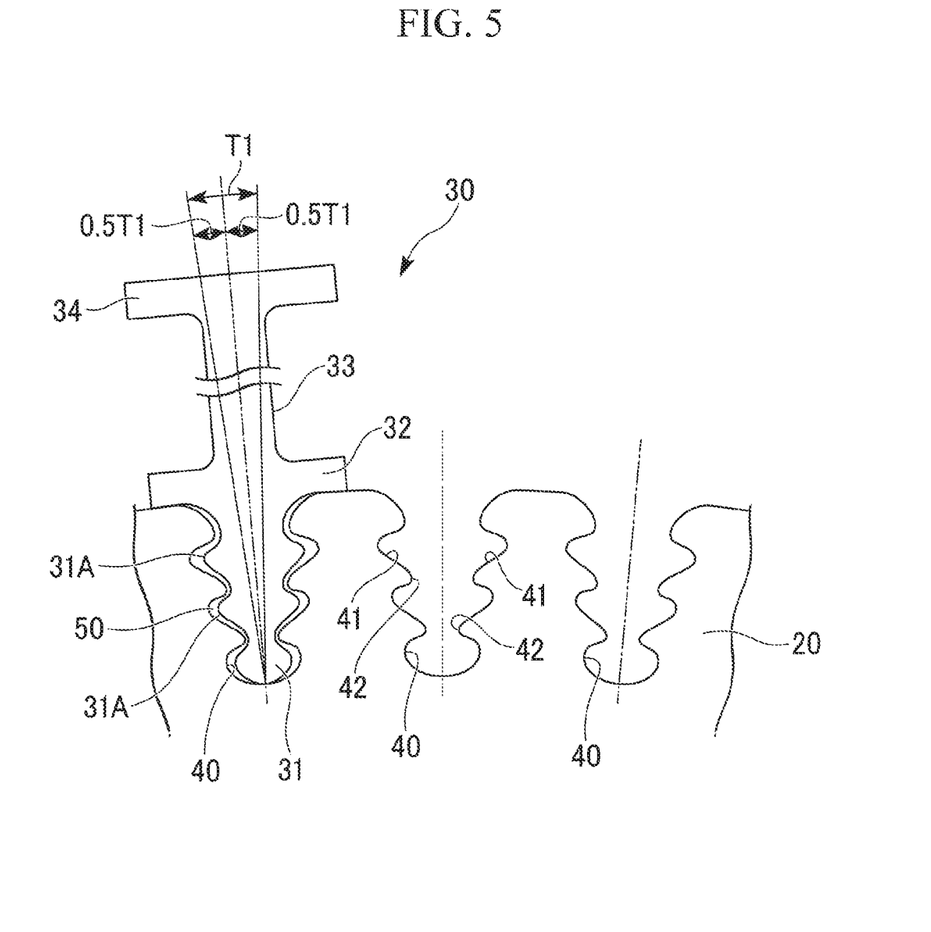
FIG. 5 is a view illustrating a reference position detecting step in the embodiment of the present invention.
Figure 6:
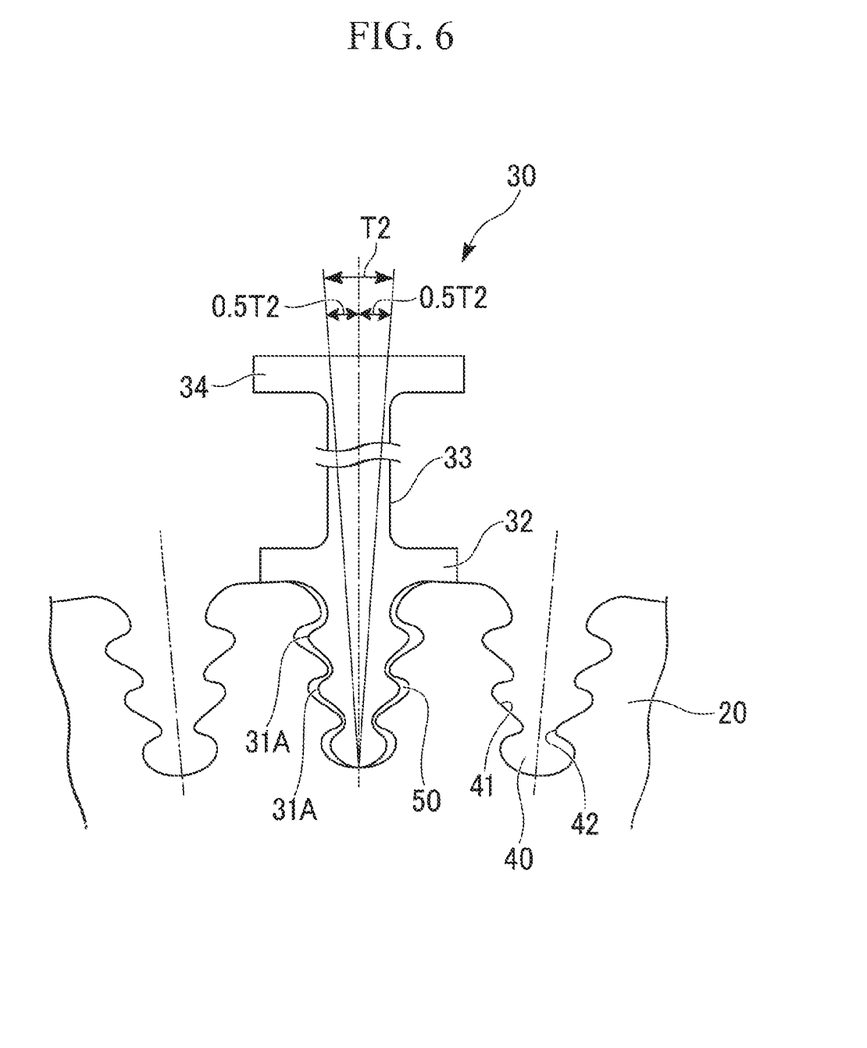
FIG. 6 is a diagram illustrating the reference position detecting step in the embodiment of the present invention.
Figure 7:
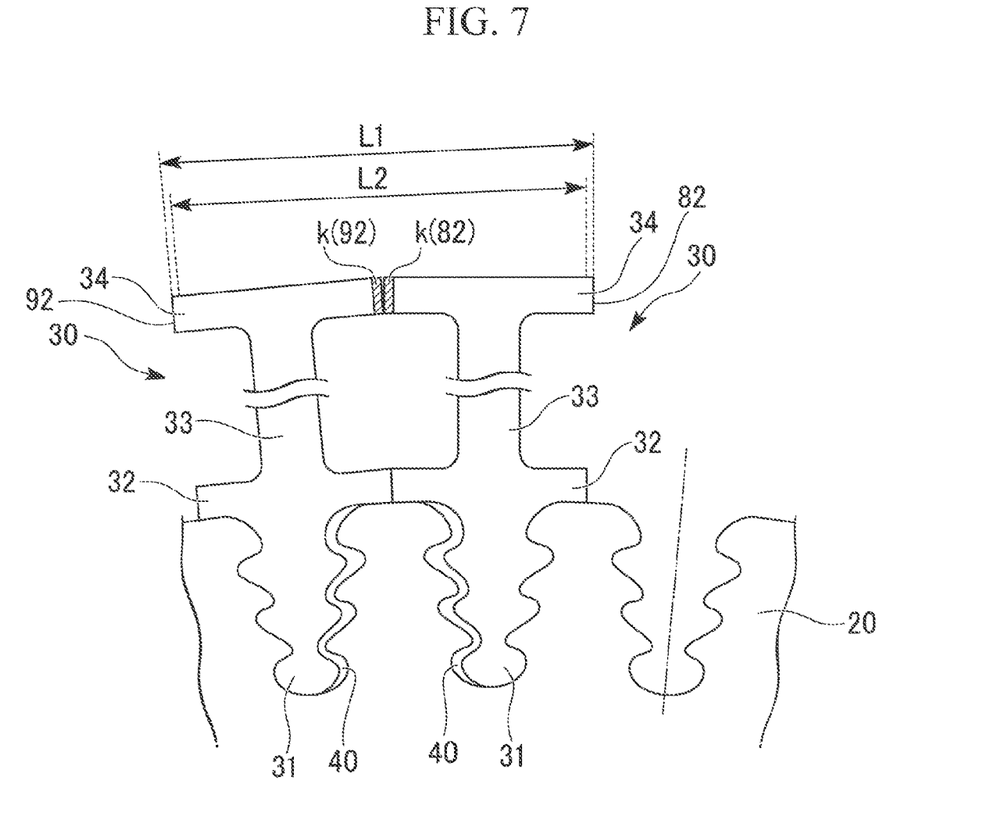
FIG. 7 is a view illustrating a spreading dimension acquiring step in the embodiment of the present invention.
Figure 8:
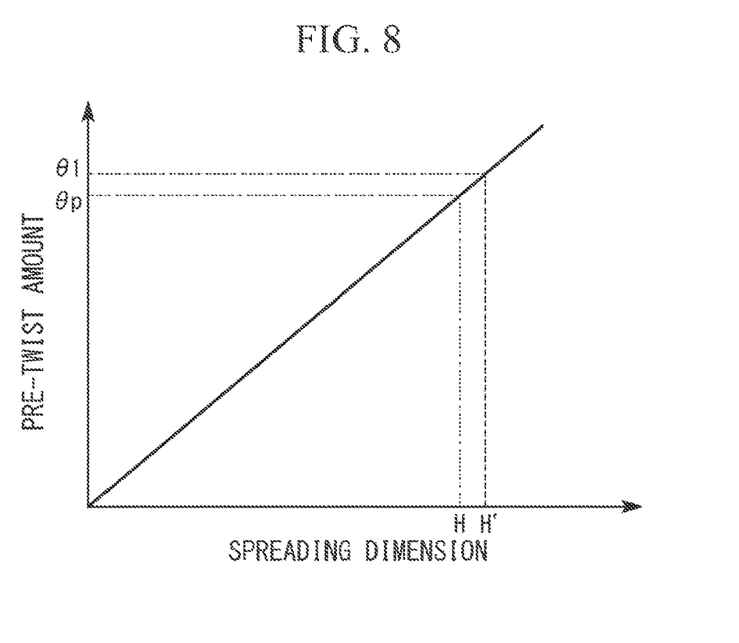
FIG. 8 is a graph illustrating a correlation between a pre-twist amount and a spreading dimension of the rotor blade in an embodiment of the present invention.

Next, a method for manufacturing the rotor according to the embodiment will be described. FIG. 3 is a flowchart illustrating each step of a method for measuring the pre-twist and a method for manufacturing the rotor according to the embodiment of the present invention. FIG. 4 is a flowchart illustrating the method for measuring the pre-twist according to the embodiment of the present invention. FIG. 5 is a diagram illustrating a reference position detecting step in the embodiment of the present invention. FIG. 6 is a diagram illustrating the reference position detecting step in the embodiment of the present invention. FIG. 7 is a diagram illustrating a spreading dimension acquiring step in the embodiment of the present invention. FIG. 8 is a graph illustrating a correlation between the pre-twist amount and the spreading dimension of the rotor blade in the embodiment of the present invention.

As illustrated in FIG. 3, the method for manufacturing the rotor according to the embodiment includes each step as the method for measuring the pre-twist, a cutting process of cutting the cutting margin K, an inserting step of inserting the rotor blade 30 into the disc 20. As illustrated in FIG. 4, the method for measuring the pre-twist in the embodiment includes a reference position detecting step, a spreading dimension acquiring step, a misalignment acquiring step, a pre-twist amount acquiring step, and a correcting step.

First, each step (step S11 to step S15) illustrated in FIG. 4 is performed as the method for measuring the pre-twist (step S01).

In the reference position detecting step (step S11), one rotor blade 30 is inserted into the blade groove 40, and the reference position of the rotor blade 30 is detected. As illustrated in FIG. 5, a gap 50 is formed in the circumferential direction between the blade root 31 of the rotor blade 30 and the blade groove 40. Due to the gap 50, the rotor blades 30 slightly swing in the circumferential direction. The magnitude of the swinging is measured first. Specifically, the swinging amount of an arbitrary point on the shroud 34 (for example, a point P1 at the aforementioned abutting portion C) when moving the rotor blade 30 in the circumferential direction is measured by a measuring device such as a dial gauge. When the swinging amount is "T1", a value obtained by multiplying T1 by 0.5, that is, a position at which 0.5T1 is obtained is set as a reference position of the rotor blade 30. Specifically, after measuring the swinging amount T1 with the measuring device, 0.5T1 is calculated and recorded on the basis of T1. After the detection of the reference position is completed, the rotor blade 30 is detached from the blade groove 40.

Subsequently, as illustrated in FIG. 6, the aforementioned steps are also performed on the rotor blade 30 adjacent to the aforementioned rotor blade 30. That is, a swinging amount T2 at the reference position of the rotor blade 30 is detected, and 0.5T2 is calculated on the basis of detection. After detection of the reference position is completed, the adjacent rotor blade 30 is detached from the blade groove 40. In this embodiment, a case in which the reference position of the rotor blade 30 on the front side in the rotational direction is sequentially detected after the rotor blade 30 on the rear side in the rotational direction is illustrated as an example. However, it is also possible to sequentially detect the reference position of the rotor blade 30 on the rear side in the rotational direction after the rotor blade 30 on the front side in the rotational direction.

In the spreading dimension acquiring step (step S12), the two rotor blades 30, on which the above-mentioned reference position detecting step has completed, are first inserted into the two adjacent blade grooves 40. At this time, the rotor blades 30 are inserted into the blade grooves 40 so that the contact surfaces of the shrouds 34 of the rotor blades 30 (the second front end edge 82 and the second rear end edge 92) come into contact with each other. At this time, in the disc 20, in order to align the positions of the two rotor blades 30 in the direction of the axis O, the one opening of the blade grooves 40 into which the two rotor blades 30 are inserted is closed by a flat plate-like jig (not illustrated). When the blade root 31 inserted into the blade groove 40 butts against the jig, the two rotor blades 30 are positioned in the direction of the axis O of the blade root 31 with respect to the disc 20.

As described above, the cutting margin K is provided in advance on each contact surface. Therefore, when two rotor blades 30 are inserted at the same time, the rotor blades 30 slightly move to separate from each other in the circumferential direction.

In the spreading dimension acquiring step, the length in the circumferential direction of the shrouds 34 of the two rotor blades 30 in which the blade root 31 is inserted into the blade groove 40 is further measured. Specifically, as illustrated in FIG. 7, a distance between a second rear end edge 92, which is a rear side contact surface of the rotor blade 30 on the rear side in the rotational direction, and a second front end edge 82 which is a front side contact surface of the rotor blade 30 on the front side in the rotational direction, is measured using a measuring device such as a dial gauge. The value at this time is defined as a circumferential actual measurement value L1.

Next, the circumferential length L2 at the above-mentioned reference position is subtracted from the circumferential actual measurement value L1 to calculate the spreading dimension H. Specifically, the calculation illustrated in the following formula (1) is performed.

$$H = L1 - L2 \tag{1}$$

As illustrated in the formula (1), the spreading dimension H represents a difference between the circumferential length L2 of the two shrouds 34 and the circumferential actual measurement value L1, when assuming a state in which both the pair of rotor blades 30 is at the reference position.

Next, in the misalignment acquiring step (step S13), a misalignment amount G in the direction of the axis O between the shrouds 34 of the two rotor blades 30 adjacent to each other in the circumferential direction is measured. The misalignment amount G can be acquired by measuring the misalignment amount in the direction of the axis O between the upstream end edges 60 of the two rotor blades 30 or the misalignment amount in the direction of the axis O between the downstream end edges 70. The measurement of the misalignment amount G is performed, using a measuring device such as a dial gauge. As illustrated in FIG. 2, in the misalignment amount G, although each of the positions G1 and G2 of the upstream end edges 60 (or the downstream end edges 70) of the two shrouds 34 may be measured to obtain the difference thereof, a difference between the upstream end edge 60 (or the downstream end edge 70) not protruding in the direction of the axis O and the upstream end edge 60 (or the downstream end edge 70) protruding in the direction of the axis O may be directly measured by a dial gauge. The aforementioned spreading dimension and the misalignment amount are interlocked. Therefore, by performing the misalignment acquiring step at the same time as the aforementioned spreading dimension acquiring step, it is possible to further improve the detection accuracy of the misalignment amount.

Next, in the correcting step (step S14), the spreading dimension H acquired in the spreading dimension acquiring step is corrected on the basis of the misalignment amount G acquired in the misalignment acquiring step (step S13). Specifically, a correction value H' of the spreading dimension is acquired by the following formulas (2) and (3).

$$H' = H - \Delta H \tag{2}$$

$$\Delta H = G/\tan(\text{Angle}) \tag{3}$$

Here, "Angle" is an angle (a design value) of the contact surface (the second front end edge 82 and the second rear end edge 92).

Next, in the pre-twist amount acquiring step (step S15), a pre-twist amount is acquired on the basis of the correction value H' obtained in the correcting step. The spreading dimension H has a correlation as illustrated in FIG. 8 between the spreading dimension H and the aforementioned pre-twist amount (hereinafter referred to as the pre-twist amount $\theta$). More specifically, as the spreading dimension H increases, since the force F applied to the contact surfaces (the second front end edge 82 and the second rear end edge 92) of the rotor blade 30 increases, the pre-twist amount $\theta$ increases linearly. The pre-twist amount $\theta$ can be obtained by referring to the correlation graph. The pre-twist amount $\theta$ may be obtained from the correction value H', for example, using a mathematical formula, a table or the like, regardless of the correlation graph.

As described above, a series of steps of the method for measuring the pre-twist is completed, and the process proceeds to a pre-twist amount comparing step illustrated in FIG. 3.

In the pre-twist amount comparing step (step S02), a pre-twist amount $\theta$1 corresponding to the correction value H' is compared with a target pre-twist amount $\theta$p on the basis of the correlation between the spreading dimension H and the pre-twist amount $\theta$ illustrated in FIG. 8. It is determined whether the pre-twist amount $\theta$1 falls within the range of the target pre-twist amount $\theta$p (a range that can be said to be substantially the same) (step S03). As a result of the determination, when it is determined that the pre-twist amount $\theta$1 does not fall within the range of the target pre-twist amount $\theta$p, the process proceeds to the cutting step (step S04) for cutting the cutting margin K, and after fine adjusting, the process returns to the step S01 again. That is, the adjustment is repeated until the pre-twist amount $\theta$1 based on the correction value H' falls within the range of the target pre-twist amount $\theta$p. In the embodiment, the pre-twist amount $\theta$1 is adjusted by cutting the side near the back portion 33B of the blade 33 of the rotor blade 30, that is, the second front end edge 82.

When it is determined in the above determination (step S03) that the pre-twist amount $\theta$1 falls within the target pre-twist amount $\theta$p, the process proceeds to the inserting step.

In the inserting step (step S05), when the pre-twist amount $\theta$1 of the blades 33 of all the rotor blades 30 over the entire circumference of the disc 20 is adjusted within the range of the target pre-twist amount $\theta$p, the rotor blades 30 are inserted into the blade grooves 40 in the circumferential direction.

According to the aforementioned embodiment, the misalignment amount G in the direction of the axis O between the shrouds 34 of the two rotor blades 30 adjacent to each other in the circumferential direction is measured, while acquiring the spreading dimension H of the shroud 34 in the circumferential direction. Therefore, the misalignment of the pre-twist amount $\theta$ caused by the misalignment amount G in the direction of the axis O can be corrected with respect to the pre-twist amount θ obtained from the spreading dimension H of the shroud 34. Therefore, it is possible to more accurately presume the pre-twist amount θ.

In addition, the spreading dimension can be obtained by merely comparing the respective reference positions of the two rotor blades 30 with the dimensions of the two shrouds 34 in the circumferential direction when inserting the two rotor blades 30 so that the contact surfaces come into contact with each other.

Furthermore, it is possible to measure the pre-twist amount θ for all the rotor blades 30, by merely repeating the same steps over the entire circumference of the disc 20.

Further, the contact surfaces (the second front end edge 82 and the second rear end edge 92) can be cut on the basis of the corrected pre-twist amount θ. Therefore, the rotor blades 30 on which the contact surfaces (the second front end edge 82 and the second rear end edge 92) are appropriately cut can be, for example, collectively inserted into the blade groove 40. In other words, when attaching the rotor blade 30 to the disc 20, the rotor 1 can be easily manufactured without returning to other processes or occurrence of repetition or the like.

The present invention is not limited to the configuration of the aforementioned embodiment, and the design can be changed within the scope that does not depart from the gist thereof.

For example, although the case in which the cutting margin K is subjected to cutting process is explained in the aforementioned embodiment, as long as it is possible to adjust the thickness of the cutting margin K, the process is not limited to the cutting process.

INDUSTRIAL APPLICABILITY

The present invention can be applied to a method for measuring a pre-twist amount of blade and a method for manufacturing a rotor. According to the present invention, it is possible to more precisely presume the pre-twist amount of the blade.

REFERENCE SIGNS LIST

1 Rotor
10 Rotor main body
20 Disc
30 Rotor blade
31 Blade root
31A Serration
32 Platform
33 Blade
33A Abdominal portion
33B Back portion
34 Shroud
36 Leading edge
37 Trailing edge
40 Blade groove
41 Inner wall surface
42 Teeth
50 Gap
60 Upstream end edge
70 Downstream end edge
80 Front end edge
81 First front end edge
82 Second front end edge
83 Third front end edge
90 Rear end edge
91 First rear end edge
92 Second rear end edge
93 Third rear end edge
C Abutting portion
Dp Rotor blade reference line
O Axis

The invention claimed is:

1. A method for measuring a pre-twist amount of a blade included in a plurality of rotor blades attached to an outer circumferential portion of a disc rotatable about an axis, the method comprising:
a spreading dimension acquiring step of attaching two rotor blades adjacent to each other in a circumferential direction to the disc by causing the two adjacent rotor blades to slide in a direction of the axis so that contact surfaces of shrouds formed at blade tips of each blade come into contact with each other, and acquiring a spreading dimension in the circumferential direction of the shrouds of the two rotor blades attached to the disc;
a misalignment acquiring step of measuring a misalignment amount in the direction of the axis between the shrouds of the two rotor blades adjacent to each other in the circumferential direction;
a correcting step of acquiring a correction value of the spreading dimension acquired in the spreading dimension acquiring step on the basis of the misalignment amount acquired in the misalignment acquiring step; and
a pre-twist amount acquiring step of acquiring a pre-twist amount of the blade on the basis of the correction value acquired in the correcting step.

2. The method for measuring the pre-twist amount of the blade according to claim 1, further comprising:
a reference position detecting step of attaching only one rotor blade of the two adjacent rotor blades to the disc to detect a reference position of the one rotor blade, and attaching only the other rotor blade of the adjacent two rotor blades to the disc to detect a reference position of the other rotor blade,
wherein, in the spreading dimension acquiring step, a distance in the circumferential direction between respective points of each shroud of the two adjacent rotor blades attached to the disc is detected, and the detected distance in the circumferential direction is compared with the reference position of the one rotor blade and the reference position of the other rotor blade to acquire the spreading dimension.

3. The method for measuring the pre-twist amount of the blade according to claim 2, wherein the spreading dimension acquiring step and the reference position detection step are sequentially performed on the two adjacent rotor blades over the entire circumference of the disc.

4. A method for manufacturing a rotor, using the method for measuring the pre-twist amount of the blade according to claim 1, the method for manufacturing the rotor comprising:
a cutting step of cutting a contact surface of at least one of the shrouds on the basis of the pre-twist amount acquired in the pre-twist amount acquiring step; and
a step of sequentially attaching each rotor blade of which the contact surface is cut to the disc.

5. A method for manufacturing a rotor, using the method for measuring the pre-twist amount of the blade according to claim 2, the method for manufacturing the rotor comprising:
a cutting step of cutting a contact surface of at least one of the shrouds on the basis of the pre-twist amount acquired in the pre-twist amount acquiring step; and
a step of sequentially attaching each rotor blade of which the contact surface is cut to the disc.

6. A method for manufacturing a rotor, using the method for measuring the pre-twist amount of the blade according to claim 3, the method for manufacturing the rotor comprising:
- a cutting step of cutting a contact surface of at least one of the shrouds on the basis of the pre-twist amount acquired in the pre-twist amount acquiring step; and
- a step of sequentially attaching each rotor blade of which the contact surface is cut to the disc.

* * * * *